No. 772,889. PATENTED OCT. 18, 1904.
H. KETTERER.
HORSE FAN.
APPLICATION FILED JAN. 21, 1904.
NO MODEL.

Witnesses:
K. H. Butten
E. E. Potter

Inventor
H. Ketterer,
By H. C. Evert & Co.
Attorneys.

No. 772,889. Patented October 18, 1904.

UNITED STATES PATENT OFFICE.

HERMAN KETTERER, OF CORAOPOLIS, PENNSYLVANIA.

HORSE-FAN.

SPECIFICATION forming part of Letters Patent No. 772,889, dated October 18, 1904.

Application filed January 21, 1904. Serial No. 190,000. (No model.)

*To all whom it may concern:*

Be it known that I, HERMAN KETTERER, a citizen of the United States of America, residing at Coraopolis, in the county of Allegheny and State of Pennsylvania, have invented certain new and useful Improvements in Horse-Fans, of which the following is a specification, reference being had therein to the accompanying drawings.

This invention relates to certain new and useful improvements in fans for animals, and relates more particularly to horse-fans.

The present invention has for its object the provision of novel means whereby a constant movement of the fan is obtained when the animal is moving.

Another object of the present invention is to mount and construct the device in such a manner that the fan will vibrate by the horse motion and will create currents of air that will cool the head of the animal.

My invention further aims to provide a device that will be extremely simple in construction, strong, durable, comparatively inexpensive to manufacture, and highly efficient in its operation.

With the above and other objects in view the invention consists in the novel construction, combination, and arrangement of parts to be hereinafter more fully described, and specifically pointed out in the claims.

In describing the invention in detail reference is had to the accompanying drawings, forming a part of this application, and wherein like numerals of reference indicate like parts throughout the several views, in which—

Figures 1, 2:
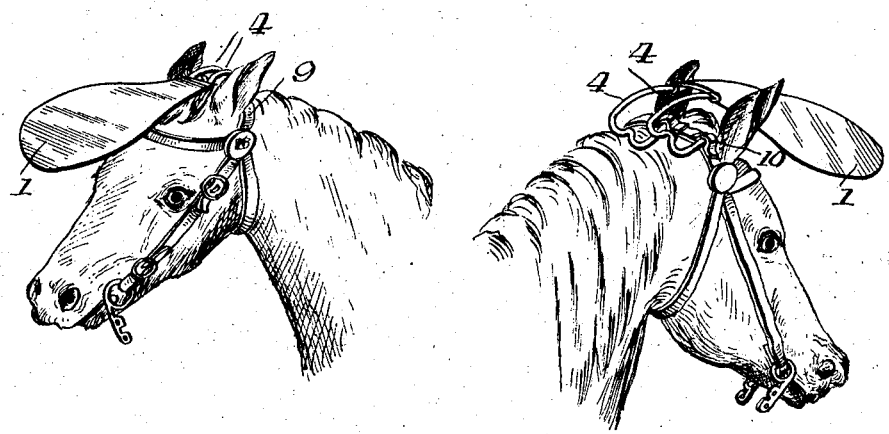
Figure 3:
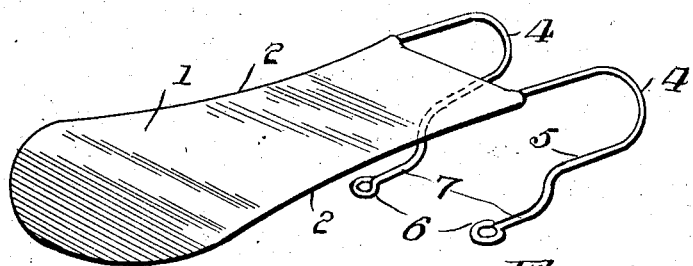
Figure 4:
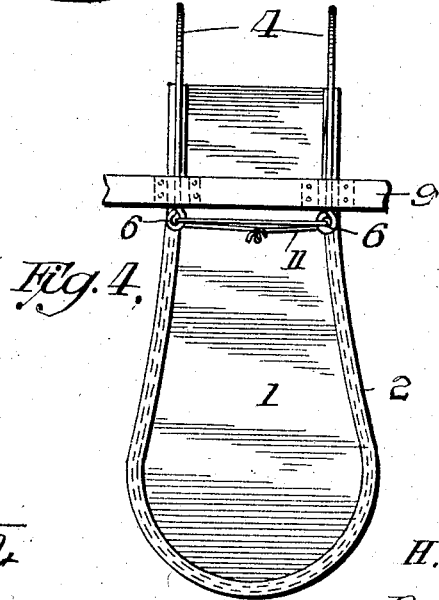

Figure 1 is a front perspective view of my improved animal-fan secured to the bridle, representing the same as it appears upon the horse. Fig. 2 is a rear perspective view of the same. Fig. 3 is an enlarged perspective view of the device, showing the same detached. Fig. 4 is an under plan view thereof.

To put my invention into practice, I provide a frame made from a single piece of suitable wire, which I double to form two parallel arms 2 2, these arms at the doubled end forming the front or loop, being bowed outwardly, whereby the device is widest at a point adjacent its rounded foremost end. The two arms are bent downwardly, as at 4, forming spring-bows, and are then bent forwardly to form the parallel spring-arm 5, and then bent downwardly and forwardly to form the parallel arms 7, and terminate in the eyelets 6, where they are connected together by a cord 11 or like means. The frame is secured to a bridle by engaging the arms 7 in keepers 10, secured to the head-strap 9 of the bridle. A covering 1 of any suitable material is secured to the arms 2 of the frame and extends from the front end to a point adjacent the downward bends 4 of the frame, being secured in any desired manner, as by stitching or otherwise.

It will be seen that the slightest movement will cause the fan to vibrate and produce atmospheric currents which will cool the animal's head and that the device will also partially protect the animal's head from the rays of the sun, as will be readily apparent.

The many advantages obtained by the use of my improved fan will be readily apparent from the foregoing description, taken in connection with the accompanying drawings.

It will be obvious that various slight changes may be made in the details of construction without departing from the general spirit of my invention.

Having fully described my invention, what I claim as new, and desire to secure by Letters Patent, is—

1. In a fan and sun-shield for horses, a spring-frame composed of a single piece of wire looped to form a fan-frame, said looped portion being covered with suitable material and the free ends of the frame being doubled back to form spring-arms and provided with eyelets for the reception of a connection by means of which the free ends may be held rigidly in the head-strap of a bridle.

2. In a fan for animals, a frame composed of a single piece of wire, the ends of which are formed with eyelets adapted to receive a flexible connection and the said ends being bent on themselves in vertical planes to form spring-bows and then looped in a substantially horizontal plane and covered with suitable material at the looped portion to form a fan.

In testimony whereof I affix my signature in the presence of two witnesses.

HERMAN KETTERER.

Witnesses:
H. C. EVERT,
E. E. POTTER